United States Patent
Tran et al.

(10) Patent No.: US 7,254,667 B2
(45) Date of Patent: Aug. 7, 2007

(54) DATA TRANSFER BETWEEN AN EXTERNAL DATA SOURCE AND A MEMORY ASSOCIATED WITH A DATA PROCESSOR

(75) Inventors: Tan Ba Tran, Round Rock, TX (US); Richard Roy Grisenthwaite, Cambridgeshire (GB); Gerard Richard Williams, Sunset Valley, TX (US)

(73) Assignee: Arm Limited, Cambridge (GB)

( * ) Notice: Subject to any disclaimer, the term of this patent is extended or adjusted under 35 U.S.C. 154(b) by 327 days.

(21) Appl. No.: 10/815,982

(22) Filed: Apr. 2, 2004

(65) Prior Publication Data

US 2005/0223130 A1    Oct. 6, 2005

(51) Int. Cl.
*G06F 12/00* (2006.01)
(52) U.S. Cl. .................. 711/100; 712/215; 711/105
(58) Field of Classification Search ............... 711/100, 711/154; 713/400; 712/34; 365/201
See application file for complete search history.

(56) References Cited

U.S. PATENT DOCUMENTS

| | | | | |
|---|---|---|---|---|
| 5,675,615 A | * | 10/1997 | Watt | 375/354 |
| 5,752,071 A | * | 5/1998 | Tubbs et al. | 712/34 |
| 6,069,829 A | * | 5/2000 | Komai et al. | 365/201 |
| 6,208,583 B1 | * | 3/2001 | Fujiwara | 365/233 |
| 6,473,821 B1 | * | 10/2002 | Altmayer et al. | 710/240 |
| 6,653,867 B1 | * | 11/2003 | Shihadeh | 326/96 |
| 6,782,064 B1 | * | 8/2004 | Schwake | 375/354 |
| 2003/0033573 A1 | * | 2/2003 | Tamura et al. | 714/763 |
| 2003/0135699 A1 | * | 7/2003 | Matsuzaki et al. | 711/149 |
| 2005/0166033 A1 | * | 7/2005 | Jacob | 712/11 |

* cited by examiner

*Primary Examiner*—Pierre-Michel Bataille
(74) *Attorney, Agent, or Firm*—Nixon & Vanderhye P.C.

(57) ABSTRACT

A data processor core 10 comprising a memory access interface portion 30 operable to perform data transfer operations between an external data source and at least one memory associated with said data processor core and a data processing portion 12 operable to perform further data processing operations in response to receipt of said processor clock signal CLK. The two portions of the core being operable to be independently enabled such that one portion may be active while the other is inactive.

36 Claims, 7 Drawing Sheets

DATA TRANSFER BETWEEN AN EXTERNAL DATA SOURCE AND A MEMORY ASSOCIATED WITH A DATA PROCESSOR

BACKGROUND OF THE INVENTION

1. Field of the Invention

This invention relates to the field of data processing systems and more particularly to data transfer between an external data source and a memory associated with a data processor.

2. Description of the Prior Art

In data processing systems it is often necessary to transfer data from one memory to another, or between an external data source and a memory associated with the data processor. For example, boot up codes may be stored in a slow memory such as a Flash and prior to them being used, it may be desirable to transfer them to a faster instruction memory associated with the processor. Generally, such transfers occurs via the data processor core, with a load instruction specifying a location in the Flash memory from which the data is to be read and a register in the core to which the data item is to be written, and a store instruction specifying the register in the core and the destination location in the faster instruction memory. Such a transfer is fairly slow and is expensive in instructions, taking several instructions for each data item.

The problem of data transfers being relatively slow and expensive in instructions has become more acute recently with the increasing use of wire free networks, these have the potential of transferring large amounts of data to a processor, at any time.

SUMMARY OF THE INVENTION

Viewed from one aspect the present invention provides a data processor core comprising: a clock signal input operable to receive a processor clock signal; a memory access interface -portion operable to perform data transfer operations between an external data source and at least one memory associated with said data processor core in response to receipt of said processor clock signal; a data processing portion operable to perform further data processing operations in response to receipt of said processor clock signal; at least one further input operable to receive a memory access enable signal; at least one read/write port operable to receive and send data via a bus to said at least one memory associated with said data processor core; wherein said memory access interface portion is operable to receive said processor clock signal when said memory access enable signal has a predetermined value and not to receive said processor clock signal when said memory access enable signal does not have said predetermined value; and said data processing portion is operable to receive said processor clock signal when a data processing enable signal has a further predetermined value and not to receive said processor clock signal when said data processing enable signal does not have said further predetermined value.

By using a processor core that is divided into portions, including a data processing portion and a memory access interface portion, the portions being independently enabled means that data can be transferred via the memory access interface even if the rest of the processor core is sleeping, i.e. clocking to the data processing portion of the core is turned off (analogous to a Wait-for-Interrupt mode). Likewise the core can operate while the memory access interface is not operational. The division of the core into portions has further advantages, including the possibility to transfer data via the memory access interface portion faster than via a standard processor core. This is because the hardware of the memory access interface is dedicated to data transfers and as such the instructions required to enable a data transfer via the multi-purpose processing portion are not required, although some indication of address, and whether it is a read or write is needed. Furthermore, the ability to allow the two portions to sleep independently of each other provides the potential for significant power savings as each portion can be effectively turned off when it is not required.

Preferably, said processor further comprises data processing enable logic operable to generate said data processing enable signal.

Production via the core itself of a data processing enable signal means in effect that the data processing portion can be turned on or off in response to various conditions or received signals.

In preferred embodiments, said data processing enable signal is operable to generate said data processing enable signal in response to detection of a state of a processor clock and a state of a bus in data communication with said read/write port.

As the ability to transfer data via the data processing portion of the core may depend on the state of the bus transferring data to the at least one memory and the state of the processor clock itself, the processing logic is preferably operable to monitor these states and to produce a suitable signal.

In other embodiments, the data processor core comprises a second further input, said second further input being operable to receive said data processing enable signal. The data processing enable signal may come from a source external to the core, this source being able to control whether the data processing portion is active or not.

In some embodiments, said predetermined value and said further predetermined value are the same, whereas in others they are not. This means that the enable signals may both, for example, have a value of one to enable the respective DMA interface and the processing portion of the core, alternatively, one may require a one to enable its portion while the other will enable its portion with a zero.

Preferably, said memory access interface is operable to transfer data to or from said at least one memory via said read/write port and said bus.

The bus is operable to transfer data between the core and the at least one memory, and the DMA interface may use this connection. The memory access interface implements the AMBA AHB (Advanced High Performance Bus) protocol so that data can be transferred via such a bus without additional control signals being added to the data by an external controller.

In some embodiments, said external data source comprises a further memory associated with said processor core, while in others it may comprise a data source communicating with the processor via a wireless network.

In other embodiments, said external data source comprises a further memory, said memory access interface being operable to transfer data to and from said further memory via a direct memory access controller.

If the further memory is not associated with the processor, it may not be connected to it via a standard bus, in such a case a direct memory access controller will be needed between the external data source and the memory access interface to place data in a suitable form for the direct memory access interface (the direct memory access interface implements the AMBA AHB protocol). This generally means that the direct memory access controller transfers the data item in the form of the data itself, an address in the at least one memory from which it is to be read or to which it is to be written and a control portion indicating whether read or write is envisaged.

In some embodiments, said further memory comprises a flash memory operable to store boot up code and said at least one memory comprises an instruction memory, said memory access interface portion being operable to transfer said boot up code from said flash to said instruction memory in response to receipt of said processor clock.

It is particularly advantageous, to be able to transfer boot up code from a slow flash memory to a faster instruction memory prior to boot up via a DMA interface as this can be operational when a portion of the core may not be, i.e. before boot up.

Preferably, said memory access enable signal comprises a clock signal having a different frequency to said processor clock signal and periodically, at said different frequency, going from a first state having said predetermined value to a second state riot having said predetermined value, said memory interface being operable to receive said processor clock in response to said memory enable signal being in said first state and not to receive said processor clock in response to said memory enable clock being in said second state.

Using a clock signal of a different frequency as the memory access enable signal means that the direct memory access interface can be driven by a resultant clock signal having a different frequency to the processor clock. This can be particularly advantageous in situations where the external data source is a memory that operates at a slower clocking speed than the processor clock. Being able to drive the memory access interface at a slower clocking speed enables data to be successfully transferred from the slower memory to the instruction memory.

Advantageously, the data processor core further comprises at least one logic gate operable to gate said processor clock signal received at said processor clock signal input from said processor clocking signal, said at least one logic gate being operable to output said processor clock when said processor enable signal has said further predetermined value and not to output said processor clock signal when said processor enable signal does not possess a further predetermined value, said data processing portion receiving said output of said at least one logic gate such that said data processing operations performed by said data processing portion are clocked by said output of said at least one logic gate.

Logic gates are a simple yet effective way of combining the enable signal with the processor clock signal to provide clocking of the processing portion when the processor enable signal indicates that this is to occur.

In preferred embodiments, the data processor core further comprises at least one logic gate operable to combine said processor clock signals received at said processor clock signal input with said memory access enable signal received at said at least one further input, said at least one logic gate being operable to output said processor clock signal when said memory access enable signal has said predetermined value and to output said processor clock signal when said memory access enable signal does not posses said predetermined value, said memory access interface portion receiving said output of said of at least one logic gate such that said data transfer operations performed by said memory access interface are clocked by said output of said at least one logic gate.

Combing the memory access enable signal with the processor clock using logic gates is a simple and effective way of providing a clocking signal to the memory access interface when the enable signal indicates that it should be active.

Preferably, said core further comprises: arbitration logic associated with said read/write port; wherein said arbitration logic is operable to route a data access request requesting access of data in one portion of said at least one memory received from said memory access interface to one of said at least two buses providing access to said one portion of said at least one memory and to route a further data access request requesting access of data in a further portion of said at least one memory received from said data processing portion to a further one of said at least two buses providing access to said further portion of said at least one memory, said routing of said data access requests being performed during the same clock cycle.

One problem associated with providing a memory access interface portion of the core along side the processing portion is that both portions may wish to access data stored in an associated memory at the same time. This problem can be particularly acute in applications such as data logging, where a large amount of data that does not need to be processed immediately is transferred via the core to a memory. This problem is addressed in embodiments of the invention by providing at least two buses operable to provide data communication between the processor core and the associated memory, the associated memory being divided into at least two portions, a bus providing data access to respective portions. Arbitration logic is provided in association with the bus and the read/write port and is operable to route data access requests requesting access to data in a particular portion of the memory to the appropriate bus. The provision of more than one bus allows data access requests to different portions of the memory that are received from the memory access interface and the data processing portion of the core in the same clock cycle to be processed in parallel along respective buses. This alleviates some of the problems that can occur when two portions of the core are trying to access one memory via a single bus.

In preferred embodiments, the arbitration logic is operable to select one of said at least two buses to route said data access request to, in dependence upon an address location within said at least one memory associated with said data access request.

The address associated with the data provides an indication of the portion of the memory where it is stored and is thus a useful indicator that can be used by the arbitration logic to determine which bus to use.

In preferred embodiments, said at least two portions of said memory comprise an instruction portion operable to store instructions and at least one data portion operable to store data items said arbitration logic being operable to route said access requests to a first one of said at least two buses providing access to said instruction portion when data to be transferred is an instruction and to route said data access requests to a second one of said at least two buses providing access to said at least one data portion when data to be transferred is a data item.

The division of the memory into an instruction portion and a data portion is a practical way of dividing the memory.

Preferably, said at least one data portion comprises two data portions an even data portion operable to store data having an even address and an odd data portion operable to store data having an odd address, said read/write port being operable to transfer data between said processor core and said at least one memory via three buses, a first bus providing access to said instruction portion, a second bus providing access to said odd data portion and a third bus providing access to said even data portion, and said arbitration logic being operable to route a data access request to said first bus when data to be transferred in an instruction, to said second bus when data to be transferred is a data item associated with an odd address and to said third bus when data to be transferred is a data item associated with an even address.

By dividing the data portions into odd and even address portions, a data access request that accesses a large number of concurrently stored data items will use alternate data buses. This means that it is highly unlikely that one of the portions of the processor core will monopolise one of the data buses for a long period and thereby prevent access to the corresponding portion of the memory by the other portion of the processor core.

In preferred embodiments, said arbitration logic is operable in response to said receipt of a data access request from said memory access interface portion and a data access request from said data processing portion, both data access requests requesting access to data in one portion of said at least one memory to route said data access request from said memory access interface portion to one of said at least two buses providing data access to said one portion of said at least one memory before routing said request from said processing portion to said one said at least two buses.

The arbitration logic is operable to give priority to the memory access interface when data access requests from both portions are received during the same processor clock cycle. This is because the memory access interface is provided on the processor core in order to give fast access to memory and thus it makes sense to give it priority. The provision of a plurality of buses helps prevent the processing portion of the core being denied access to a memory over a long period of time which could seriously affect operation of the core particularly if important code is being executed by the processing portion of the core.

Advantageously, said arbitration logic is operable to detect a wait request from at least one busy portion of said at least one memory, said arbitration logic being operable not to route any data access requests to said busy portion until said wait request is no longer detected.

In some embodiments the memory may not operate as fast as the processor clock. In such cases, it is highly convenient that a wait signal can be used which the arbitration logic understands. This prevents data access requests being sent to or from the memory faster than it can cope with them.

A further aspect of the present invention comprises a data processing apparatus comprising a data processor core according to a first aspect of the present invention and at least one memory.

Preferably, the data processing apparatus further comprises a direct memory access controller operable to control transfer of data from said external data source to said at least memory via said memory access interface.

A direct memory access controller can be used to amend data from an external data source in a form suitable for processing by the direct memory access interface.

A still further aspect of the present invention comprises a method of transferring data between external data source and a memory associates with a data processor core comprising a memory access interface portion and a data processing portion, said method comprising steps: receiving a processor clock signal, a processing enable signal and a memory access signal at the core; when said memory access enable signal has a predetermined value, performing data transfer operations at said memory access interface portion clocked by said processor clock signal and not performing said data transfer operations from said memory access enable signal does not pass the predetermined value; and when said processing enable signal has a further predetermined value performances of data processing operations at said processing portion clocked by said processor clock signal and not performing said processing operations in said processing enable signal does not have said predetermined value.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
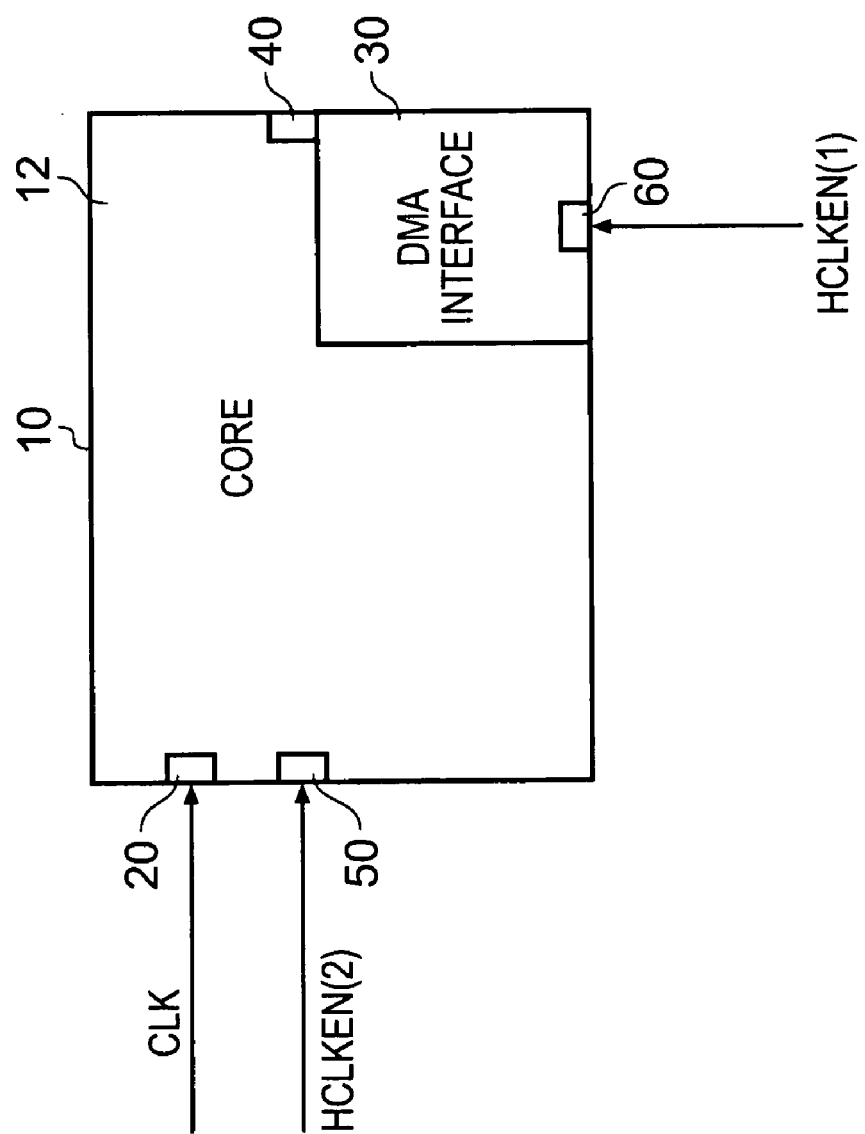
FIG. 1 schematically illustrates a processor core according to an embodiment.

FIG. 1 shows a processor core 10 which is divided into portions, one portion 12 being a standard data processing portion, and the other portion being a direct memory interface (DMA) 30. The processor core 10 has a clock signal input 20 for receiving a processor clocking signal CLK, and at least one read/write port 40 operable to be connected via a bus to memory associated with the core. The core may also have two further inputs a memory access enable signal input 60 for receiving a clock enable signal HCLKEN(1) and a processor enable input 50 for receiving a clock enable signal HCLKEN(2). In some embodiments the processor enable signal HCLKEN(2) is not received as an external signal, but is generated by processing logic within the core (see FIG. 3). The processing portion 12 of the core is clocked by the processor clock signal CLK when the HCLKEN(2) signal has a predetermined value in this embodiment when it is 1. When the HCLKEN(2) signal is 0 the processing portion does not receive the processor clock signal CLK and it is thus, not active.

The direct memory interface portion 30 of the core is also clocked by the processor clock signal CLK. It only receives this CLK signal when the memory access enable signal HCLKEN(1) has a predetermined value in this embodiment 1. When it is zero the memory access interface 30 does not receive the processor clock signal CLK and it is then inactive.

Figure 2:
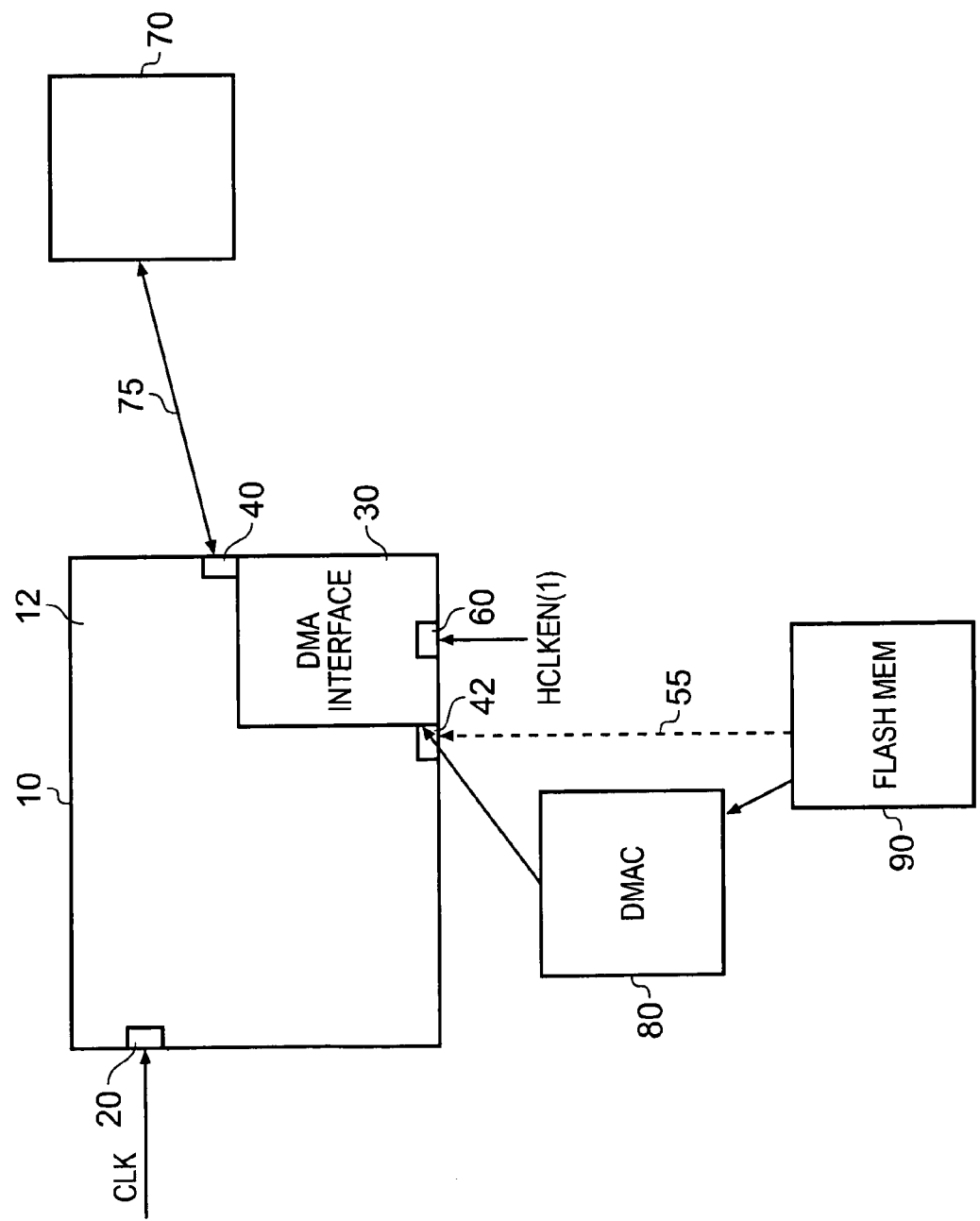
FIG. 2 schematically shows a data processing apparatus according to an embodiment.

FIG. 2 shows a data processing apparatus according to an embodiment of the present invention, having a data processor core 10 as shown in FIG. 1, an instruction memory 70, a direct memory access controller (DMAC) 80, and a flash memory 90. The processor core is connected to the instruction memory 70 by a data bus 75. The instruction memory 70 is a tightly coupled memory and as such data transfers between the memory and the core always take a certain predictable time.

The DMAC 80 controls the transfer of data between an external data source, in this case the flash memory 90, and a memory associated with the core, in this case the instruction memory 70 via the DMA interface 30. In this embodiment the external data source is a flash memory associated with the processor, but embodiments of the invention can transfer data between any other external data source and a memory associated with the processor. In the embodiment shown data is transferred between Flash memory 90 and instruction memory 70 via a DMA interface 30. This can be done while the processing portion 12 is active or while it is sleeping, i.e. HCLKEN(2) is 1 or 0. The DMAC adds control signals to the data being transferred, the control signals indicating the address where the data is (to be) stored in memory 70 and a signal indicating whether the data transfer is a read or write.

In some embodiments where the flash memory or other external data source is connected to the processor core via an AMBA bus, the data can be sent directly via the AMBA bus 55 to the DMA interface and the DMAC 80 is not required. This is possible as the bus has a protocol which is understood by the DMA interface, and thus, the required address and control signals are already associated with the data being transferred and the addition of these signals by a DMAC is not required.

The DMA interface 30 is clocked by the processor clock signal CLK and at each clock cycle a data item and its corresponding address are input to the DMA interface. They are then stored in a register and in a subsequent clock cycle output via read/write port 40 along data bus 75 to instruction memory 70.

One example of operation of the data processing apparatus of FIG. 2 is on boot up. In this embodiment, the boot up code of a data processor is stored in the flash memory 90. Flash memory is reasonably slow memory, thus prior to executing this code it is transferred to a faster instruction memory 70. Before boot up occurs the processor core is inactive, following receipt of a boot up request, the DMAC 80 reads the boot up code from the flash memory 90 and passes the data to the DMA interface via the input 42. At this point the memory access enable signal HCKLEN(1) is set to one and thus, the DMA interface reads data items passed from the DMAC, the DMA interface being clocked by the processor clock. This data passes through the DMA interface 30 and is then output via the read/write port 40 and the data bus 75 of the processor core to instruction memory 70. In this embodiment the core is sleeping (clocking to the data processing portion of the core is turned off and it is in wait-for-interrupt mode) and thus, the DMA interface 30 can use the data bus connecting the core with the memory, without any potential conflict with data transfers from the core itself.

Figure 3:
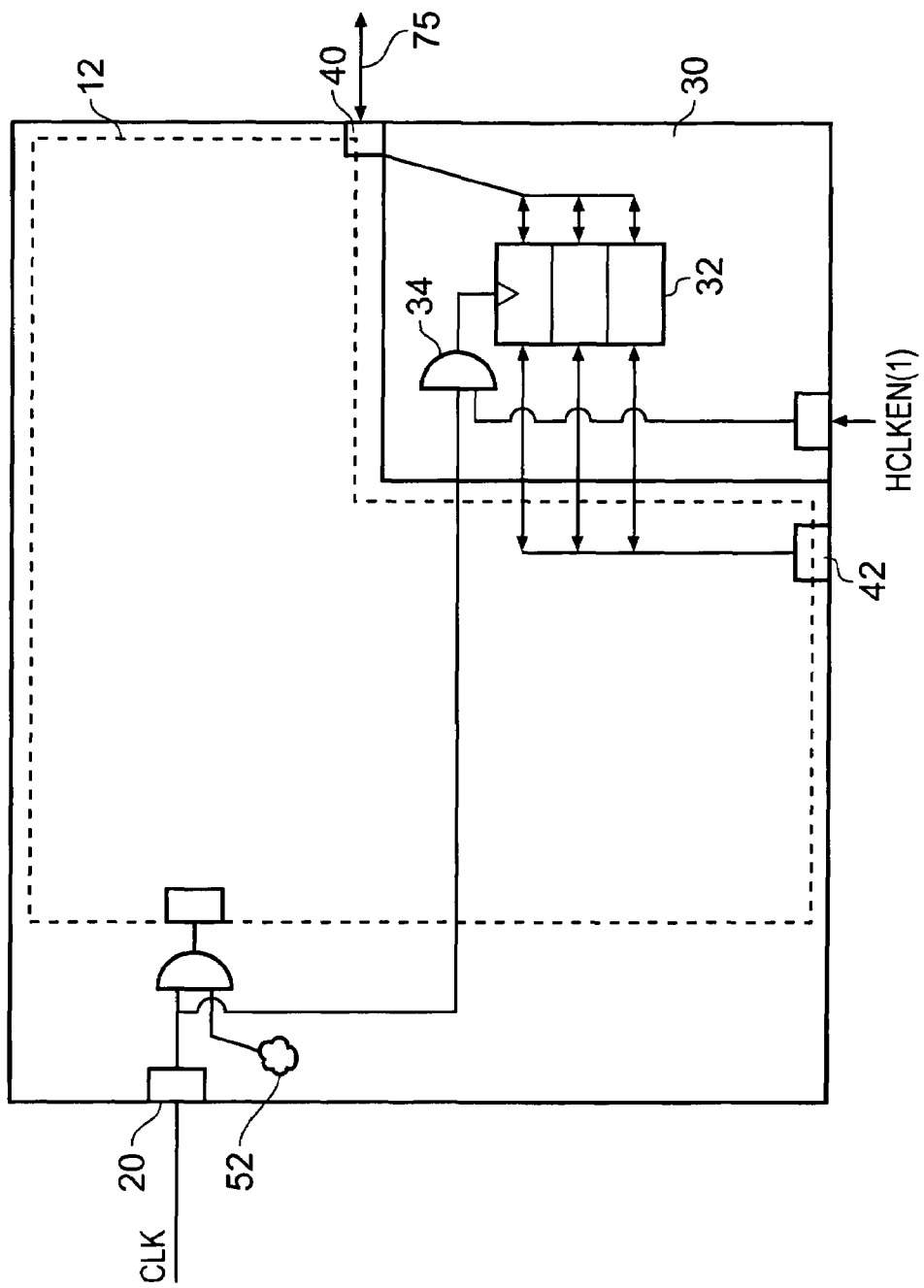
FIG. 3 schematically shows a processor core in more detail.

FIG. 3 shows a processor core similar to the one shown in FIG. 1, in this embodiment the processor enable signal is not input to the core as an external signal but is generated by processing logic 52. This processing logic generates the processing enable signal in response to monitoring the state system controller of the core. The processing enable signal and the processor clock signal are passed through an AND gate and the output of the AND gate is used to clock the processing portion 12 of the processor core. Thus, when the processing enable signal is one the processor clock signal CLK is received by the processing portion 12 and when it is zero no clock signal is received and thus the processing portion of the core is inactive or sleeping. In the sleeping mode the core samples for interrupt or debug requests on external pins, and once it receives one of these a processor enable signal gets generated by processing logic 52 indicating to the processor core that it should exit the Wait-for-Interrupt mode (i.e. sleep mode).

FIG. 3 also shows the direct memory access interface portion 30 of the core 10 of FIG. 1 in greater detail. The DMA interface 30 comprises several registers 32 each operable to hold data transferred from an external data source and input to the core via input 42 or data transferred from a memory and input via bus 75 to read/write port 40. This data is held in the registers 32 and is then transferred either to the external data source or to the memory. The direct memory access interface 30 also comprises an AND gate 34 operable to AND the processor clock with the memory interface enable signal HCLKEN(1). The process of data transfer including the storage in the registers is clocked via a signal output from AND gate 34. AND gate 34 receives the processor clock signal CLK as one input and a memory access interface enable signal HCLKEN (1) as the other input. Thus, when the memory access interface enable signal is enabled, i.e. is one, the processor clock is present at the output of the AND gate 34 and thus the direct memory access interface is clocked and is active and the registers 32 can receive and transfer data. When HCLKEN(1) is 0 no clock signal is received and the memory access interface 30 is inactive. The data transferred includes data items, an address associated with the data items and a control signal which represents whether the data is to be read from the address or written to it. They are generally transferred in parallel to the registers 32 according to the AMBA protocol.

Figure 4:
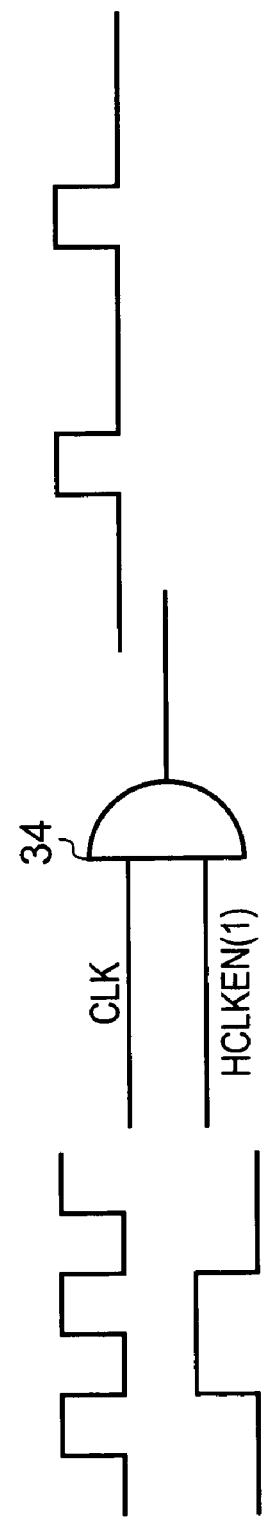
FIG. 4 shows an example of logic operable to combine a clock and clock enable signal.

FIG. 4 shows AND gate 34 of the direct memory access interface receiving two clocking signals. As can be seen, in this example the clock enable signal is not a steady signal but is rather a clock signal itself. This results in AND gate 34 producing a clock signal of different frequency to the processor clock at its output. It is this signal which clocks the data transfers performed by the memory access interface 30. This can be advantageous when data is being transferred from a slow memory that cannot operate at the clocking speed of the processor clock. The ability to provide a slower clock in this way is an efficient and simple way to alleviate potential problems-associated with slow memory allowing as it does data transfer to occur at a rate that is suitable for the slower memory.

Figure 5:
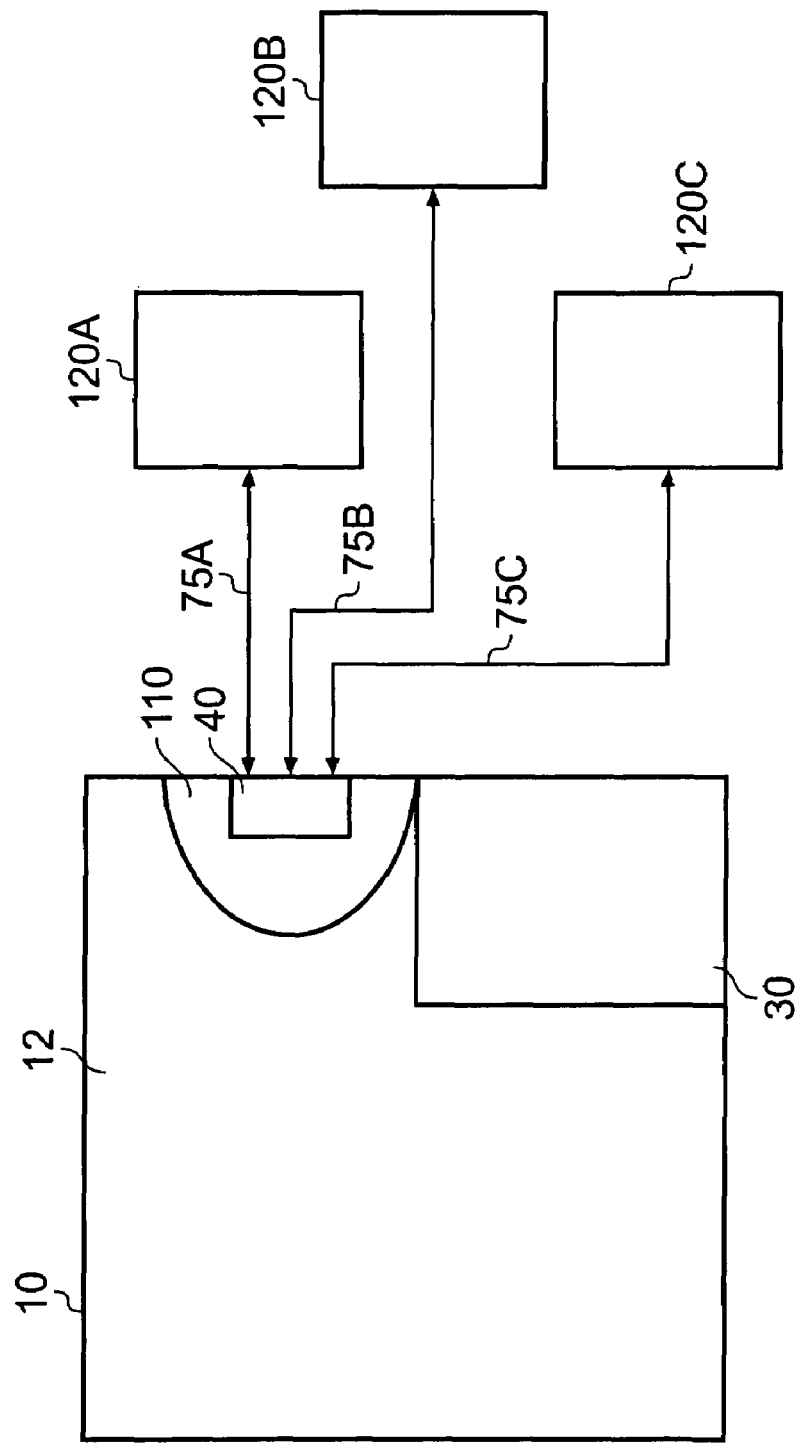
FIG. 5 schematically shows a processor core, memory and buses linking the two according to an embodiment.

One potential problem of having a memory access interface 30 that can be active at the same time as a further processing portion of a data processing core is that they might both request data accesses via read/write port 40 at the same time. FIG. 5 shows a way of dealing with this. In this embodiment arbitration logic 110 is provided associated with the read/write port 40, the arbitration logic controlling which data access request is handled first when two data access requests are received in the same clock cycle. As the direct memory interface 30 is provided in order to give fast data transfer, the arbitration logic 110 is set up to always give DMA data access requests priority over requests received from the processing portion 12. One potential problem with this is that if a large data transfer request is received from an external data source, the bus 75 could be monopolised for some time by the DMA interface 30 and thus, the processing portion 12 which may need to execute important code that needs access to a memory along bus 75, would suffer starvation. This problem has been addressed in embodiments by making the read/write port 40 able to attach to a plurality of data buses. FIG. 5 shows read/write port 40 connected to 3 buses 75A, 75B and 75C.

In this embodiment tightly coupled memory 120 (see FIG. 6) is divided into three portions. Portion 120a is operable to store data having an even address, portion 120b is operable to store data having an odd address and portion 120c is operable to store instructions. Data bus 75a connects read/write port 40 to the even data portion of the memory 120a, bus 75b connects read/write port to the odd data portion for memory 120b and bus 75c connects the read/write port to the instruction portion of the memory 120c. In this way there are three possible routes to tightly coupled memory 120 and they can be used in parallel during the same clock cycle. This alleviates the problem of data starvation that might occur to the processing portion 12 of the data processor core 10 when priority is given in all cases to data access requests from the direct memory access interface 30.

Arbitration logic 110, controls which requests are given priority it also controls the routing of data access requests to an appropriate bus. It does this by monitoring the address associated with the data and then puts it on the bus which is operable to access the portion of the memory 120 containing this address. It should be noted that although instruction portion of the memory 120c is generally used to store instructions, it is possible for data items to be placed alongside the instructions in cases where an instruction has data associated with it. The routing of the data is done using the address associated with the data rather than by detection of the sort or data that is being transferred.

In addition to controlling routing of the signals, and giving priority to data access requests from the DMA interface 30, arbitration logic. 110 can also be used to detect wait signals output from portions of the memory when the memory is too slow to keep up with the data access requests coming out of the core and clocked by the processor clock CLK. In this case the arbitration logic 110 does not process any further data access requests until the wait signal is no longer detected.

Figure 6:
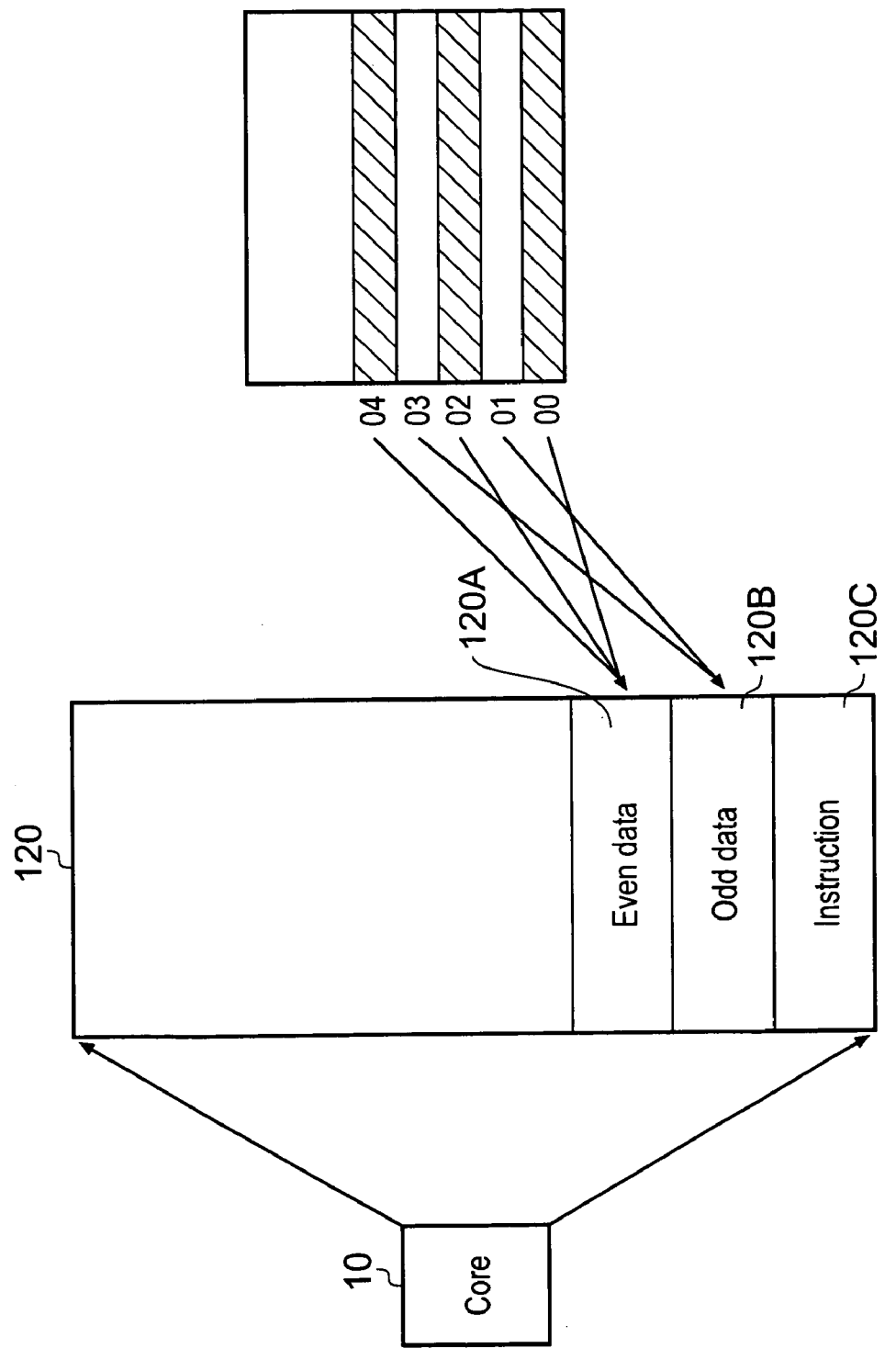
FIG. 6 shows an associated memory according to an embodiment.

FIG. 6 shows in more detail the tightly coupled memory 120 which is associated with processor core 10. As can be seen the memory is divided into portions, the even addresses being mapped to portion 120a and the odd addresses being mapped to portion 120b. Instructions are stored in portion 120c. The mapping of data using even and odd addresses in this way means that several data items that have adjacent addresses are accessed in series using alternate buses 120a and 120b. This means that the chances of one of the buses to a particular portion of memory being monopolised by a large number of serial data access requests is low, and thus starvation of data to the processing portion of the core is unlikely to occur.

Figure 7:
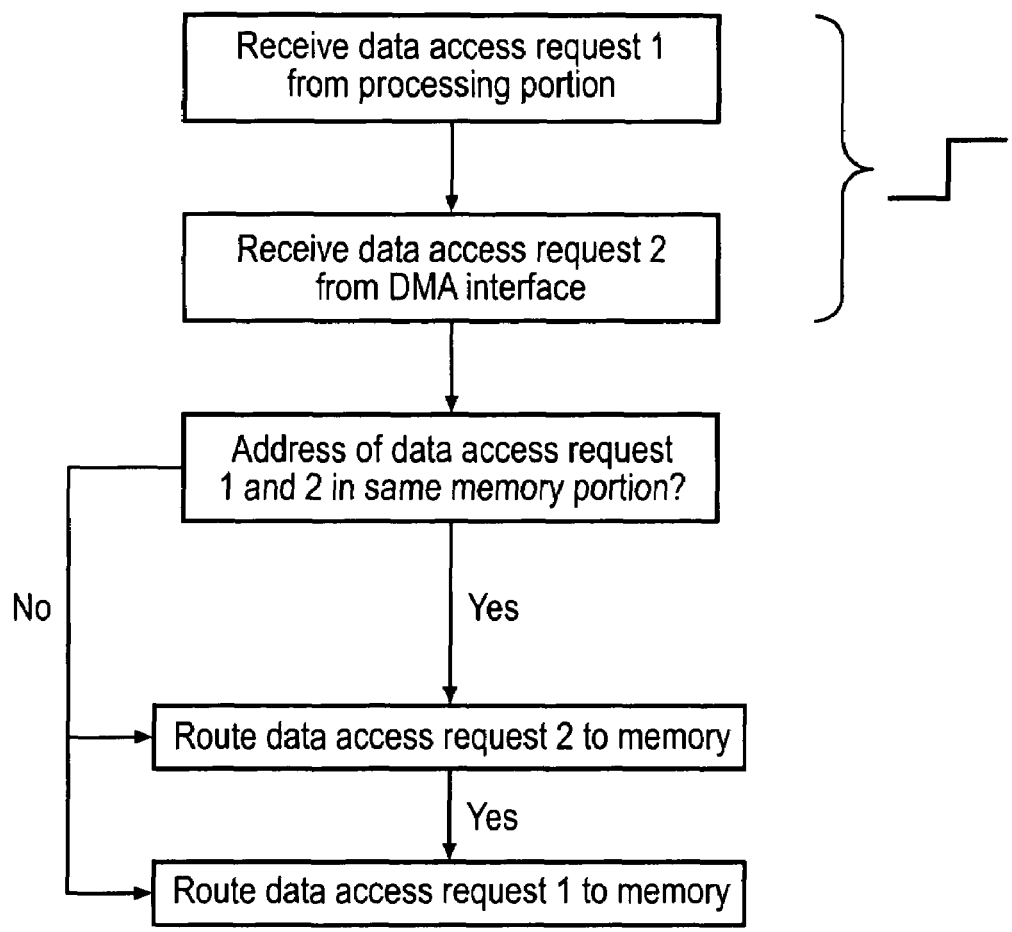
FIG. 7 shows a flow diagram illustrating the steps involved in routing data access requests.

FIG. 7 shows a flow diagram schematically showing how arbitration logic 110 deals with data access requests from the processing portion 12 and DMA interface received in the same clock cycle. As can be seen the arbitration logic checks to see if they are accessing an address in the same portion of memory and if they are not they are routed along respective buses in parallel. If they comprise addresses in the same memory portion then data access request 2 from the DMA interface is routed first and in the next clock cycle data access request 1 from the processing portion is routed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A data processor core comprising:
a clock signal input operable to receive a processor clock signal;
a memory access interface portion operable to perform data transfer operations between an external data source and at least one memory associated with said data processor core in response to receipt of said processor clock signal;
a data processing portion operable to perform further data processing operations in response to receipt of said processor clock signal;
at least one further input operable to receive a memory access enable signal;
at least one read/write port operable to receive and send data via a bus to said at least one memory associated with said data processor core; wherein
said memory access interface portion is operable to receive said processor clock signal when said memory access enable signal has a predetermined value and not to receive said processor clock signal when said memory access enable signal does not have said predetermined value; and
said data processing portion is operable to receive said processor clock signal when a data processing enable signal has a further predetermined value and not to receive said processor clock signal when said data processing enable signal does not have said further predetermined value.

2. A data processor core according to claim 1, said data processor core further comprising data processing enable logic operable to generate said data processing enable signal.

3. A data processor core according to claim 2, wherein said data processing enable signal is operable to generate said data processing enable signal in response to detection of a state of said processor clock and a state of said bus in data communication with said read/write port.

4. A data processor core according to claim 1, comprising a second further input, said second further input being operable to receive said data processing enable signal.

5. A data processor core according to claim 1, wherein said predetermined value and said further predetermined value are the same.

6. A data processor core according to claim 1, wherein said memory access interface is operable to transfer data to or from said at least one memory via said read/write port and said bus.

7. A data processor core according to claim 1, wherein said external data source comprises a further memory associated with said processor core.

8. A data processor core according to claim 1, wherein said external data source comprises a further memory, said memory access interface being operable to transfer data to and from said further memory via a direct memory access controller.

9. A data processor core according to claim 1, wherein said further memory comprises a flash memory operable to store boot up code and said at least one memory comprises an instruction memory, said memory access interface portion being operable to transfer said boot up code from said flash memory to said instruction memory in response to receipt of said processor clock.

10. A data processor core according to claim 1, wherein said memory access enable signal comprises a clock signal having a different frequency to said processor clock signal and periodically, at said different frequency, going from a first state having said predetermined value to a second state not having said predetermined value, said memory interface being operable to receive said processor clock in response to said memory enable signal being in said first state and not to receive said processor clock in response to said memory enable clock signal being in said second state.

11. A data processor core according to claim 1, further comprising at least one logic gate operable to combine said processor clock signal received at said processor clock signal input with said processor clock enable signal, said at least one logic gate being operable to output said processor clock signal when said processor enable signal has said further predetermined value and not to output said processor clock signal when said processor enable signal does not have said further predetermined value, said data processing portion receiving said output of said at least one logic gate such that said data processing operations performed by said data processing portion are clocked by said output of said at least one logic gate.

12. A data processor core according to claim 1, further comprising at least one logic gate operable to combine said processor clock signal received at said processor clock signal input with said memory access enable signal received at said at least one further input, said at least one logic gate being operable to output said processor clock signal when said memory access enable signal has said predetermined value and not to output said processor clock signal when said memory access enable signal does not have said predetermined value, said memory access interface portion receiving said output of said at least one logic gate such that said data transfer operations performed by said memory access interface are clocked by said output of said at least one logic gate.

13. A data processor according to claim 1, said core further comprising:
arbitration logic associated with said read/write port; wherein
said arbitration logic is operable to route a data access request requesting access of data in one portion of said at least one memory received from said memory access interface to one of said at least two buses providing access to said one portion of said at least one memory and to route a further data access request requesting access of data in a further portion of said at least one memory received from said data processing portion to a further one of said at least two buses providing access to said further portion of said at least one memory, said routing of said data access requests being performed during the same clock cycle.

14. A data processor core according to claim 13, said arbitration logic being operable to select one of said at least two buses to route said data access request to, in dependence upon an address location within said at least one memory associated with said data access request.

15. A data processor core according to claim 14, wherein said at least two portions of said memory comprise an instruction portion operable to store instructions and at least one data portion operable to store data items, said arbitration logic being operable to route said data access request to one of said at least two buses providing access to said instruction portion when data to be transferred is an instruction and to route said data access request to another of said at least two buses providing access to said at least one data portion when data to be transferred is a data item.

16. A data processor core according to claim 15, wherein said at least one data portion comprises two data portions, an even data portion operable to store data having an even address and an odd data portion operable to store data having an odd address, said read/write port being operable to transfer data between said processor core and said at least one memory via three buses, a first bus providing access to said instruction portion, a second bus providing access to said odd data portion and a third bus providing access to said even data portion, and said arbitration logic being operable to route a data access request to said first bus when data to be transferred is an instruction, to said second bus when data to be transferred is a data item associated with an odd address and to said third bus when data to be transferred is a data item associated with an even address.

17. A data processor core according to claim 13, wherein said arbitration logic is operable in response to receipt of a data access request from said memory access interface portion and a data access request from said data processing portion, both data access requests requesting access to data in one portion of said at least one memory, to route said data access request from said memory access interface portion to one of said at least two buses providing data access to said one portion of said at least one memory before routing said request from said processing portion to said one of said at least two buses.

18. A data processor core according to claim 13, said arbitration logic being operable to detect a wait request from at least one busy portion of said at least one memory, said arbitration logic being operable to not route any data access requests to said busy portion until said wait request is no longer detected.

19. A data processing apparatus comprising a data processor core according to claim 1, said data processing apparatus further comprising said at least one memory.

20. A data processing apparatus according to claim 19, said data processing apparatus further comprising a direct memory access controller operable to control transfer of data from said external data source to said at least one memory via said memory access interface.

21. A data processing apparatus according to claim 19, said data processing apparatus further comprising a flash memory and an instruction memory.

22. A data processing apparatus according to claim 19, wherein:
said at least one memory is divided into at least two portions; and
said data processing apparatus further comprising at least two buses, each bus allowing data access to a respective portion of said at least two portions of said at least one memory.

23. A data processing apparatus according to claim 22, wherein said at least one memory is divided into three portions, an instruction portion operable to store instructions, and two data portions, an even data portion operable to store data having an even address and an odd data portion operable to store data having an odd address, said data processing apparatus comprising three buses said read/write port being operable to transfer data between said processor core and said at least one memory via said three buses, a first bus providing access to said instruction portion, a second bus providing access to said odd data portion and a third bus providing access to said even data portion.

24. A data processing apparatus according to claim 22, wherein said at least one memory is a tightly coupled memory.

25. A method of transferring data between an external data source and a memory associated with a data processor core, said data processor core comprising a memory access interface portion operable to perform data transfer operations between said external data source and said memory associated with said data processor core and a data processing portion operable to perform data processing operations, said method comprising the steps of:

receiving a processor clock signal and a memory access enable signal at the core;

performing said data transfer operations through said memory access interface portion clocked by said processor clock signal when said memory access enable signal has a predetermined value, and not performing said data transfer operations when said memory access enable signal does not have said predetermined value; and performing said data processing operations at said data processing portion clocked by said processor clock signal when a processing enable signal has a further predetermined value and not performing said data processing operations when said processing enable signal does not have said further predetermined value.

26. A method according to claim 25, said method comprising the further step of generating said data processing enable signal using data processing enable logic present on said data processor core.

27. A method according to claim 25, wherein said data processing enable signal is generated in response to detection of a state of said processor clock and a state of said bus in data communication with said read/write port.

28. A method according to claim 25, comprising the further step of receiving said data processing enable signal.

29. A method according to claim 25, wherein said predetermined value and said further predetermined value are the same.

30. A method according to claim 25, wherein said external data source comprises a further memory associated with said processor core.

31. A method according to claim 25, wherein said external data source comprises a further memory, said step of performing said data transfer operations comprising transferring data to and from said further memory via a direct memory access controller.

32. A method according to claim 25, wherein said further memory comprises a flash memory operable to store bootup code and said at least one memory comprises an instruction memory, said step of performing said data transfer operations comprising transferring said bootup code from said flash memory to said instruction memory in response to receipt of said processor clock signal.

33. A method according to claim 25, wherein said memory access enable signal comprises a clock signal having a different frequency to said processor clock signal and periodically, at said different frequency, going from a first state having said predetermined value to a second state not having said predetermined value.

34. A method according to claim 25, comprising a further step of combining said processor clock signal received at said processor clock signal input with said processor clock enable signal using at least one logic gate, and outputting said processor clock signal from said at least one logic gate when said processor enable signal has said further predetermined value and not outputting said processor clock signal when said processor enable signal does not have said further predetermined value, and receiving said output of said at least one logic gate at said data processing portion such that said data processing operations performed by said data processing portion are clocked by said output of said at least one logic gate.

35. A method according to claim 25, comprising a further step of combining said processor clock signal with said memory access enable signal using at least one logic gate, said at least one logic gate being operable to output said processor clock signal when said memory access enable signal has said predetermined value and not to output said processor clock signal when said memory access enable signal does not have said predetermined value, said memory access interface portion receiving said output of said at least one logic gate such that said data transfer operations performed by said memory access interface are clocked by said output of said at least one logic gate.

36. A method according to claim 25, comprising the further steps of:

in response to a data access request requesting access of data in one portion of said at least one memory received from said memory access interface portion and a data access request requesting access to data in a further portion of said at least one memory received from said data processing portion, routing said data access request to one of at least two buses, said one of said at least two buses providing access to said one portion of said at least one memory, and routing said data access request received from said data processing portion to a further of said at least two buses, said further bus providing access to said further portion of said at least one memory, said routing of said data access requests being performed during the same clock cycle.

* * * * *